(12) United States Patent
McKay

(10) Patent No.: US 6,300,572 B1
(45) Date of Patent: Oct. 9, 2001

(54) PLASTIC INSULATING SEAL

(76) Inventor: Michael John McKay, 403 Leisure Alne, Friendswood, TX (US) 77546-5121

( * ) Notice: Subject to any disclaimer, the term of this patent is extended or adjusted under 35 U.S.C. 154(b) by 0 days.

(21) Appl. No.: 09/575,924

(22) Filed: May 23, 2000

(51) Int. Cl.[7] .................................................. H02G 15/02
(52) U.S. Cl. ........................................ 174/74 R; 439/589
(58) Field of Search ................................ 174/74 R, 74 A, 174/75 D, 77 R, 80, 84 R, 152, 152 GM, 155, 151, 156; 439/589

(56) References Cited

U.S. PATENT DOCUMENTS

| | | | |
|---|---|---|---|
| 2,903,668 | * | 9/1959 | Cornell, Jr. ............................... 339/63 |
| 3,290,639 | * | 12/1966 | Driemeyer ............................. 339/94 |
| 3,670,287 | * | 6/1972 | Keto ................................... 339/12 R |
| 3,685,005 | * | 8/1972 | D'Alessandro ...................... 339/136 |
| 3,702,420 | * | 11/1972 | Cooper .................................. 317/61 |
| 3,721,943 | * | 3/1973 | Curr .................................. 339/94 M |
| 4,305,636 | * | 12/1981 | Jackson et al. ..................... 339/117 R |
| 4,420,210 | * | 12/1983 | Karol et al. .......................... 339/94 M |
| 4,913,673 | * | 4/1990 | Kobler ................................... 439/736 |
| 4,976,634 | * | 12/1990 | Green et al. .......................... 439/589 |
| 5,186,055 | * | 2/1993 | Kovacich et al. ...................... 73/727 |
| 5,203,723 | * | 4/1993 | Ritterq ................................. 439/589 |
| 6,030,339 | * | 2/2000 | Tatsuno et al. ....................... 600/112 |

\* cited by examiner

*Primary Examiner*—Dean A. Reichard
*Assistant Examiner*—William H. Mayo, III

(57) ABSTRACT

An electrical connector includes a connector body having an opening extending through the connector body. The opening includes a reduced diameter portion formed between internal circumferential shoulders radially extending into the opening. An electrical conductor extends through the opening. A polymeric seal is mounted about a central portion of the electrical conductor and is adapted for mating engagement with the reduced diameter portion of the opening. Opposing ceramic insulators coaxially secured about the electrical conductor compressively engage the polymeric seal for achieving and maintaining a hermetic seal between the electrical conductor and the connector body.

4 Claims, 1 Drawing Sheet

PLASTIC INSULATING SEAL

BACKGROUND OF THE INVENTION

The present invention relates to a sealed conductor, and more particularly to a plastic and ceramic encased electrical conductor for use in high temperature and high pressure environments for electrical isolation of instrument packages. Instrument packages commonly used in the petrochemical industry and military application require electrical feedthroughs which survive extreme environments and maintain electrical isolation while holding extremely high pressures. The instrument packages must meet the most severe requirements for electrical and mechanical integrity at temperatures over 500° F. and pressures exceeding 30,000 PSI. The electronics inside the instrument package must be protected from the harsh outside environment while maintaining electrical connections passing through that environment. The connection is typically made through one or more electrical conductors extending through the wall or bulkhead of the instrument package.

A common method of constructing high-pressure electrical connectors is the glass-sealing method. In the glass-sealing method, the conductor is positioned in a cavity formed in the bulkhead and glass is melted in the cavity forming a plug around the conductor. Materials are chosen to match thermal characteristics of the bulkhead, glass and conductor. Complex heat treatments are necessary to leave the desired residual stresses and some adhesion between the bulkhead, glass and conductor. The geometry of the seal is typically unsatisfactory as the sole insulator for the instrument packaging. Plastic and ceramic insulators are typically added and bonded in place with adhesive. The glass seals method requires a large compromise in material selection, has a limited tolerance to thermal shock and cycling and is very difficult to manufacture with multiple seals in complex geometries.

More recent efforts in designing high temperature and pressure instrument housings have replaced the metal body, glass and secondary insulators in small connector designs with a single piece of molded plastic. The plastic connector is a direct replacement for the older glass/metal connector. For small designs, the all plastic product has met with some success. However, these molded plastic connectors have a limited service life at higher temperatures. Current designs simply use plastic contact blocks as insulators or/and to hold elastomeric seals, as for example the hermetic connector described in U.S. Pat. No. 5,203,723.

Molded plastic connectors are well known. The applications for automotive and general industrial electrical hardware, a great deal of which are all plastic connectors, do not approach the tolerance for adversity and the level of integrity needed for the oil field and military applications or other extreme environment applications. To meet these more stringent requirements, glass seals with ceramic insulators are offered. Glass seals and plastic insulators are offered. Metal-braze seals are offered with ceramic or ceramic and plastic insulators. No one offers a plastic or plastic/ceramic compression seal.

SUMMARY OF THE INVENTION

The electrical connector of the present invention is encased in high temperature plastic and ceramic tubing. One or more holes are machined through the bulkhead of the instrument housing through which the conductor(s) is passed. The geometry of the conductor and ceramic insulators is such that a mechanical interaction between them occurs which introduces a large tensile force in the conductor and a large compressive force in the tubular ceramic and plastic insulators. This produces and maintains a sufficiently high compressive loading in the plastic insulator against the inside surface of the bulkhead so as to form a hermetic seal. Thermal or other mechanical bonding and loading mechanisms could be applied. Impedance limited coaxial configurations are possible with the addition of a sleeve and a second set of insulators.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawing.

It is noted, however, that the appended drawing illustrates only a typical embodiment of this invention and is therefore, not to be considered limiting of its scope, for the invention may admit to other equally effective embodiments.

DETAILED DESCRIPTION OF A PREFERRED EMBODIMENT

Figure 1:
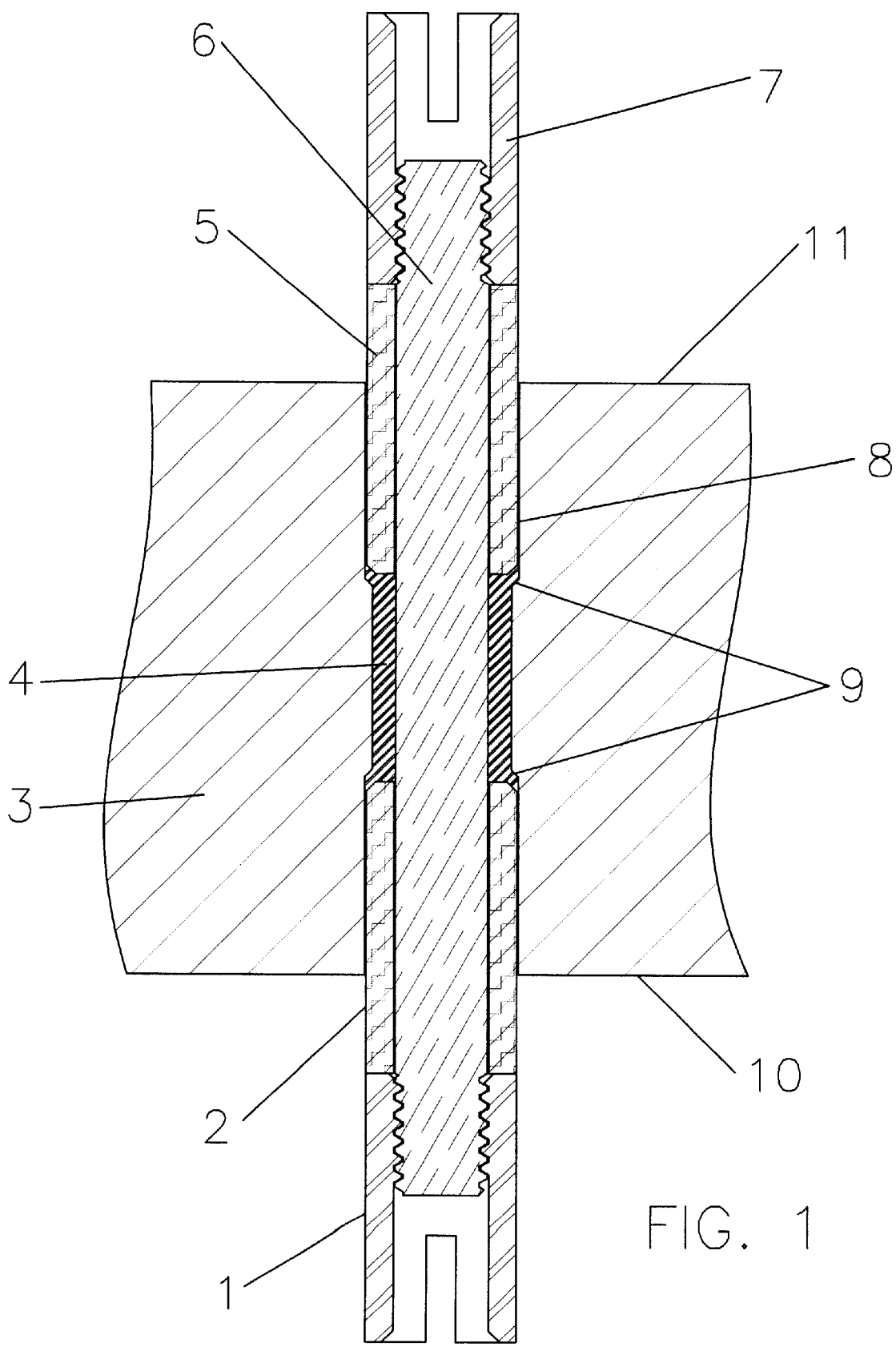
FIG. 1 is a partial section view of an instrument-housing bulkhead depicting a preferred embodiment of the plastic insulating seal of the invention.

A preferred embodiment of a plastic ceramic insulating seal in accordance with the present invention is illustrated in FIG. 1. Electrical components used in extreme high temperature and high pressure environments are typically housed within a protective housing. The housing must be leak-proof and able to withstand the high temperatures and high pressures, i.e. greater than 500° F. and 30,000 psi. encountered in such environments. The electrical components, while isolated from the surrounding environment, must nonetheless be able to be connected to a remote power supply or monitoring equipment. This often requires an electrical connection between the packaged electrical components and the remote equipment. To this end, one or more conductors extends through a wall or bulkhead (3). A conductor (6) extends through the bulkhead (3) for connecting the electrical components within the housing to the remote equipment. Due to the extreme difference in pressure between the external environment and inside the housing, the seal between the bulkhead (3) and conductor (6) is critical in maintaining the internal environment of the housing.

In the preferred embodiment of FIG. 1, the bulkhead (3) includes a hole (8) formed through the bulkhead (3) providing a passage for the conductor (6). The hole (8) has a section of reduced diameter which constrains the movement of the ceramic insulators by forming two internal circumferential shoulders (9).

Referring still to FIG. 1, the conductor (6) is encased in a high temperature plastic, such as Teflon, about a small center section. The plastic insulator (4) is captured by the ceramic insulators (2) and (5) which prevents extrusion of the plastic insulator (4) under extremely high temperatures and pressures, completely encasing the central segment of conductor (6) extending through the bulkhead (3). The opposite ends of the conductor (6) are connected to an electric circuit (not shown in the drawings) in a well-known manner.

When assembled in the manner shown in FIG. 1, the encased conductor (6) extends through the hole (8). The insulators (2) and (5) provide support for the plastic insulator (4) at both ends thereof. The ends of the ceramic insulators (2) and (5) encased about the conductor (6) extend a short distance above the external surfaces (10) and (11) of the bulkhead (3). The ends of the ceramic insulators (2) and (5) are in contact with the ends of the plastic insulator (4) and are chamfered for mating engagement. The plastic insulator (4) is forced into engagement with the circumferential shoulders (9) formed in the hole (8) by the applied pressure from the ceramic insulators. The portion of the ends of the conductor (6) which protrude beyond the ends of the ceramic are threaded. Threaded nuts, (1) and (7) engage this thread and act on the ends of the ceramic insulators (2) and (5). Thus, a tensile loading is induced in the conductor (6) and an opposing compressive loading is induced in insulators (2), (4) and (5). As a further result, a radial compressive loading is applied to and maintained in the plastic insulator (4) by the surrounding body of the bulkhead (3). This results in two seals. The first seal is between the conductor (6) and the plastic insulator (4), and the second between the plastic insulator (4) and the bulkhead (3). With an appropriate selection of conductor and insulator materials, a necessary portion of this load can be maintained throughout the desired temperature range. Berylium copper, Teflon and alumina are a possible combination with the desired complimentary thermal properties, strength and elastic characteristics for use in accordance with this invention.

While a preferred embodiment of the invention has been shown and described, other and further embodiments of the invention may be devised without departing from the basic scope thereof, and the scope thereof is determined by the claims which follow.

What is claimed is:

1. An electrical connector, comprising:
   a) a connector body having an opening extending therethrough, said opening including a reduced diameter portion formed between oppositely facing internal circumferential shoulders extending radially inwardly in said opening;
   b) an electrical conductor having two ends and a central elongated section between said ends;
   c) seal means mounted about said central section of said electrical conductor for sealing engagement with said reduced diameter portion in said opening extending through said connector body, wherein said ends of said electrical conductor protrude from said seal means for connection to an electrical circuit; and
   d) insulator means surrounding said ends of said electrical conductor protruding from said seal means, said insulator means extending into said opening and including a portion extending out of said opening.

2. The electrical connector of claim 1 wherein said seal means comprises a polymeric sleeve adapted for sealing engagement with said reduced diameter portion in said opening extending through said connector body.

3. The electrical connector of claim 2 wherein said insulator means comprises two ceramic insulators compressively engaging opposite ends of said polymeric sleeve for achieving and maintaining a hermetic seal between said electrical conductor and said connector body.

4. The electrical connector of claim 3 wherein compressive loading on said polymeric sleeve achieves a first seal between said electrical conductor and said polymeric sleeve and a second seal between said polymeric sleeve and said connector body.

* * * * *